(No Model.)
W. R. CAMPBELL & W. J. CHAMBERS.
CORN PLANTER CHECK ROWER.
No. 278,876. Patented June 5, 1883.
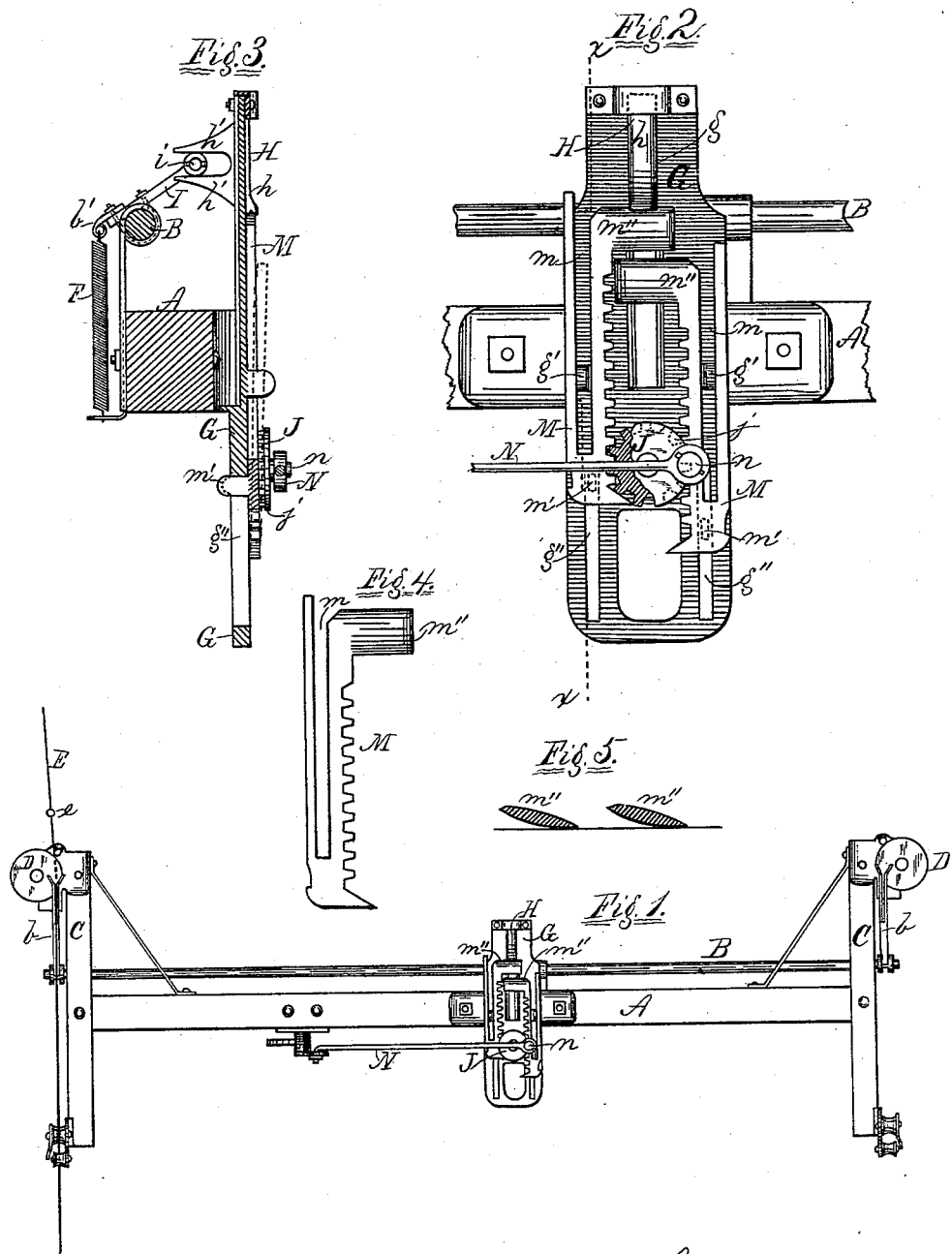
Witnesses:
J. R. Richards.
Henry J. Smithson.
Inventors:
William R. Campbell,
William J. Chambers,
By W. R. Richards, Atty.

UNITED STATES PATENT OFFICE.

WILLIAM R. CAMPBELL AND WILLIAM J. CHAMBERS, OF KIRKWOOD, ILL.

CORN-PLANTER CHECK-ROWER.

SPECIFICATION forming part of Letters Patent No. 278,876, dated June 5, 1883.

Application filed January 22, 1883. (No model.)

*To all whom it may concern:*

Be it known that we, WILLIAM R. CAMPBELL and WILLIAM J. CHAMBERS, citizens of the United States, residing at Kirkwood, in the county of Warren and State of Illinois, have invented certain new and useful Improvements in Corn-Planter Check-Rowers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to corn-planter check-rowers of that class in which tappets or enlargements on a stretched wire acting on a forked lever or levers impart movements to the seed-slides of the planter through intermediate devices; and the invention consists in improvements in said intermediate devices, as hereinafter fully described.

In the accompanying drawings, which illustrate our invention, Figure 1 is a top plan of the entire check-row device as ready for attachment to a corn-planter. Fig. 2 is an enlarged top plan of the central parts shown at Fig. 1. Fig. 3 is a sectional elevation in line $x$ $x$ in Fig. 2. Fig. 4 is a top plan of one of the rack-bars. Fig. 5 is a cross-section of the lugs on the sliding rack-bars.

Referring to the drawings by letters, the same letter indicating the same part in the different figures, A represents the bar to which the check-row devices are secured; B, a rock-shaft journaled in suitable bearings, and provided with a forked lever, $b$, at each end; C, heads on the ends of the bar A; D, guide-pulleys for the tappet-wire E, with tappets $e$; F, a spring connected with an arm, $b'$, on the rock-shaft B, for the purpose of rocking said shaft backward and swinging the forked levers forward after they have been swung backward by the tappet-wire.

The foregoing parts described by reference-letters are parts of an ordinary check-rower and need not be any more fully described herein.

G is a base-plate transversely fixed on the bar A, and has a central slot, $g$, in which a tappet, H, reciprocates. The upper part, $h$, of tappet H projects above the plate G, and its lower part, $h'$, extends below it, and is slotted to receive a stud, $i$, on an arm, I, which projects from the rock-shaft, so that the oscillations of the shaft B will give the back and forth movement to the tappet H.

J is a pinion journaled to and above the plate G. The top of the pinion J extends beyond its cogs as an annular flange, $j$, and is partly broken away at Fig. 2 to show the cogs in full lines.

M M are sliding rack-bars, one on each side of the pinion J, and each in gear with said pinion, as shown at Fig. 2. Each rack-bar has a slot, $m$, lengthwise of itself, which receives a lug, $g'$, which projects upward from the plate G. Each rack-bar has also a lug, $m'$, which projects downward into a respective slot, $g''$, in the plate G. Each rack-bar has also a lug, $m''$, at its forward end, which lugs project inward, as shown at Fig. 2, and have their forward lower sides and their rear top sides beveled off, as shown at Fig. 5, which is a sectional elevation in a line across both of them as they stand at Fig. 2.

N is a rod extending from the crank-pin $n$ on the pinion J to any suitable connection with the planter seed-slides. (Not shown.)

In operation the tappet H strikes the lugs $m''$ alternately, and as each lug $m''$ passes back the rack-bar connected therewith gives a half-rotation to the pinion J, and thus drives the other rack-bar forward, and in passing forward its lug $m''$ passes over the other lug $m''$. To permit the lugs $m''$ to pass as last described, the ends of the rack-bars to which the lugs are attached are adapted to rise a small extent, which is limited by the rack-bar coming in contact with the flange $j$ on the pinion J, which flange extends outwardly over said rack-bars.

The parts are so disposed in relation to each other that the pinion J comes to rest, after each of its movements, with its crank-pin in such position that the rod N is on its "dead-point," as shown at Fig. 2, and hence forms a lock to prevent accidental movement of the seed-slides by jarring or tilting of the planter.

Having thus described our invention, what we claim as new, and desire to secure by Letters Patent, is—

1. In a check-rower, in combination with the rock-shaft B and tappet H, the sliding rack-bars M, provided with lugs m'', substantially as and for the purpose specified.

2. In combination with the rock-shaft B and tappet H, the sliding rack-bars M, provided with lugs m'', and adapted to rise at their forward ends to pass each other, substantially as and for the purpose specified.

3. In combination with the rock-shaft and tappet H, the rack-bars M and pinion J, substantially as and for the purpose specified.

4. In combination with the rack-bars M, having lugs m'', substantially as described, the pinion J, adapted to be oscillated by said rack-bars, substantially as and for the purpose specified.

5. In combination with the plate G and pinion J, the rack-bars M, having lugs m', which project into slots g'' in the plate G, and having slots m, which receive lugs g', which project from the plate G, whereby the rack-bars may oscillate the pinion J and rise at their forward ends, substantially as and for the purpose specified.

6. In combination with a pinion, J, and rack-bars M, constructed substantially as described, a tappet, H, adapted to act on the rack-bars alternately, substantially as and for the purpose specified.

7. In combination with the sliding rack-bars and pinion J, the rod N, adapted to actuate the planter seed-slides, substantially as and for the purpose specified.

8. In combination with the rock-shaft B, tappet H, sliding rack-bars M, and pinion J, the rod N, adapted for connection with the planter seed-slides, substantially as and for the purpose specified.

9. In combination, the tappet H, sliding rack-bars M, pinion J, and rod N, substantially as and for the purpose specified.

10. In combination, the sliding rack-bars adapted to rise at their front ends, with the pinion J, having an annular flange, j, adapted to limit the rise of the rack-bars, substantially as and for the purpose specified.

In testimony whereof we affix our signatures in presence of two witnesses.

WILLIAM R. CAMPBELL.
WILLIAM J. CHAMBERS.

Witnesses:
   GEO. H. LANE,
   WILL Z. MURPHY.